(No Model.)
J. N. PEW.
JOINT FOR NATURAL GAS CONDUCTORS.
No. 317,009. Patented May 5, 1885.
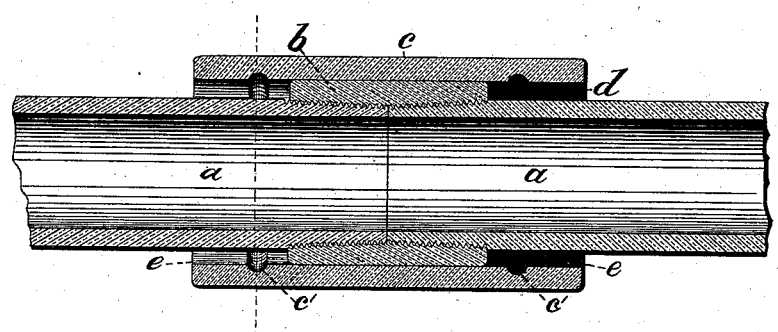
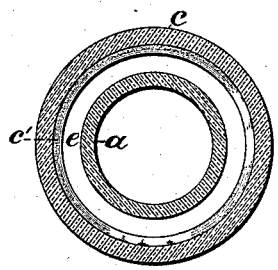
Witnesses
W. B. Corwin
J. K. Smith
Inventor
Joseph N. Pew
by his attys
Bakewell & Kerr

UNITED STATES PATENT OFFICE.

JOSEPH N. PEW, OF PITTSBURG, PENNSYLVANIA.

JOINT FOR NATURAL-GAS CONDUCTORS.

SPECIFICATION forming part of Letters Patent No. 317,009, dated May 5, 1885.

Application filed February 24, 1885. (No model.)

*To all whom it may concern:*

Be it known that I, JOSEPH N. PEW, of Pittsburg, in the county of Allegheny and State of Pennsylvania, have invented a new and useful Improvement in Joints for Natural-Gas Conductors; and I do hereby declare the following to be a full, clear, and exact description thereof.

My invention relates particularly to the construction of the joints of pipe-conductors for conveying natural gas, which, owing to its low temperature, light gravity, and the high pressure at which it passes from the wells into and through the pipes, is not only extremely liable to rupture or loosen the joints, but to leak freely through very slight defects therein. The explosive character of this gas renders it necessary to take the most careful precautions in the construction of the joints, as careless or inefficient work in this particular has resulted in great loss of property and life.

To enable others skilled in the art to make and use my improvement, which practical experience has proven to be a very safe and reliable joint, I will now describe it by reference to the accompanying drawings, in which—

Figure 1 is a longitudinal section of the same. Fig. 2 is a cross-section on the line $x\,x$ of Fig. 1.

The conductor is formed of sections of pipe $a$, united by screw sockets or couplings $b$ in the usual way. Around the joint thus made is a strong metal tube or annulus, $c$, of such size as to fit nicely over or around the socket $b$, and in the inner face of this tube near each end is a groove, $c'$. The pipes $a$ being of smaller diameter than the socket $b$, there is an annular recess or chamber, $e$, between the inner surface of the tube and the surface of the pipes beyond the ends of the socket $b$, and these recesses are calked or filled tightly with lead or other suitable packing, $d$, which, being tightly driven in, swells out into and fills the grooves $c'$, so that said grooves aid in keeping it in place. In this way I form a very strong, tight, and reliable joint, and one which, while simple and comparatively inexpensive in construction, has proven by practical use to be highly efficient. Any moderate contraction of the pipes $a$, whatever the effect on the threads of the pipes and socket, will usually compact the lead more solidly in the tube $c$ toward the grooves $c'$, instead of opening the joint.

In applying the tube $c$ it is slipped over the socket $b$ after it has been applied to one pipe $a$, and before the other is screwed in, and then it is drawn back to its proper place and calked.

The grooves $c'$, while preferred, may be omitted, if desired.

I am aware that pipe-couplings having a double sleeve and an interposed packing extending beyond the ends of the inner sleeve are not new, and I do not desire to claim the same, broadly.

What I claim as my invention, and desire to secure by Letters Patent, is—

A pipe-joint consisting of the threaded pipe-sections $a\,a$ and threaded coupling $b$, in combination with the tube $c$, fitting closely on the coupling $b$, and the lead packing $d$, calked tightly between the ends of the tube and the sides of the pipes, substantially as and for the purpose described.

In testimony whereof I have hereunto set my hand this 10th day of February, A. D. 1885.

JOSEPH N. PEW.

Witnesses:
W. B. CORWIN,
THOMAS B. KERR.